United States Patent
Woldemar et al.

(10) Patent No.: US 6,510,021 B1
(45) Date of Patent: Jan. 21, 2003

(54) MECHANICAL ISOLATION FOR A DISC DRIVE SPINDLE MOTOR

(75) Inventors: Christopher M. Woldemar, Scotts Valley, CA (US); Jason P. Hanlon, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/692,634

(22) Filed: Aug. 6, 1996

Related U.S. Application Data
(60) Provisional application No. 60/018,901, filed on Jun. 3, 1996.

(51) Int. Cl.$^7$ ................................. G11B 5/012
(52) U.S. Cl. ................................. 360/97.01
(58) Field of Search .................... 360/97.01, 97.02, 360/97.03, 97.04, 98.01, 98.07, 99.04, 99.08

(56) References Cited

U.S. PATENT DOCUMENTS

| | | | | |
|---|---|---|---|---|
| 4,291,997 A | * | 9/1981 | Laskaris | 403/24 |
| 4,315,288 A | * | 2/1982 | Bernett et al. | 360/97.03 |
| 4,346,416 A | * | 8/1982 | Riggle et al. | 360/106 |
| 4,491,888 A | * | 1/1985 | Brown et al. | 360/97.03 |
| 4,562,499 A | * | 12/1985 | Mizoshita | 360/97.03 |
| 4,780,777 A | * | 10/1988 | Biermeier et al. | 360/98.07 |
| 4,800,306 A | * | 1/1989 | Oberto | 310/51 |
| 4,835,637 A | * | 5/1989 | Mach et al. | 360/98.01 |
| 4,896,231 A | * | 1/1990 | Hoppe | 360/97.02 |
| 4,899,237 A | * | 2/1990 | Tochiyama et al. | 360/98.02 |
| 4,985,792 A | * | 1/1991 | Moir | 360/99.08 |
| 4,988,903 A | * | 1/1991 | Koriyama | 310/12 |
| 5,004,207 A | * | 4/1991 | Ishikawa et al. | 248/632 |
| 5,021,905 A | * | 6/1991 | Sleger | 360/97.02 |
| 5,025,336 A | * | 6/1991 | Morehouse et al. | 360/97.02 |
| 5,079,655 A | * | 1/1992 | Yagi | 360/97.02 |
| 5,124,855 A | * | 6/1992 | Dew et al. | 360/97.02 |
| 5,189,577 A | * | 2/1993 | Nishida et al. | 360/97.01 |
| 5,483,398 A | * | 1/1996 | Boutaghou | 360/97.02 |
| 5,666,239 A | * | 9/1997 | Pottebaum | 360/97.03 |
| 5,875,067 A | * | 2/1999 | Morris et al. | 360/97.01 |

\* cited by examiner

*Primary Examiner*—George J. Letscher
(74) *Attorney, Agent, or Firm*—Fellers, Snider, et al.

(57) ABSTRACT

Apparatus for mechanically isolating an excitation source, such as a disc drive spindle motor, to reduce the generation of acoustic noise by and to suppress the effects of external mechanical shocks upon a disc drive. The disc drive includes a base deck having a central opening, the central opening having an interior surface. A mechanical isolator formed by an annular ring of compliant material is disposed within the central opening of the base portion so that an exterior surface of the mechanical isolator is connected to the interior surface of the central opening in the base portion. The mechanical isolator further includes a central opening having an interior surface to which an exterior surface of an inner support portion is attached, the inner support portion supporting the excitation source. The mechanical isolator serves to isolate the inner support portion from the base portion of the base deck, damping the transfer of mechanical energy between the base portion and the support portion.

15 Claims, 2 Drawing Sheets

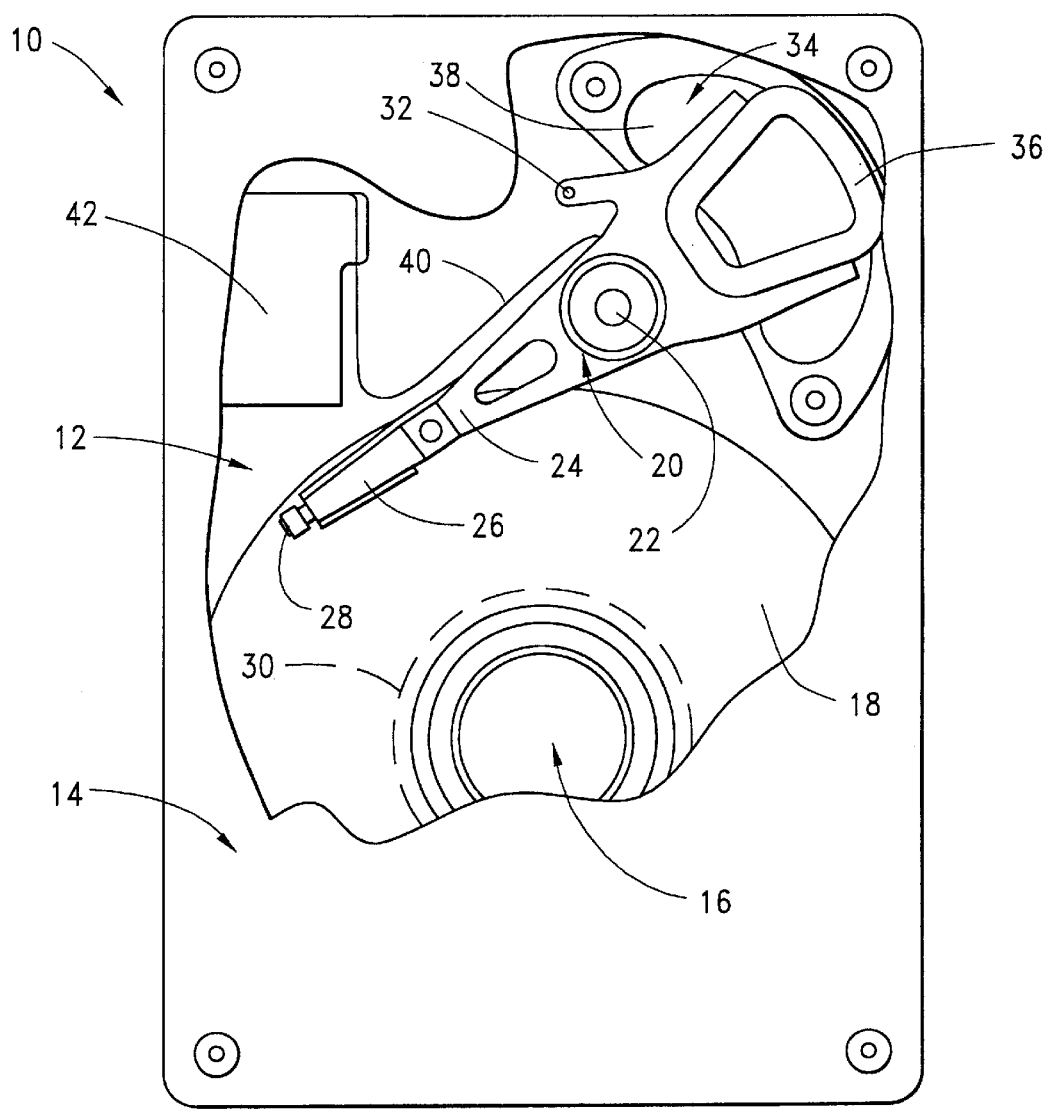
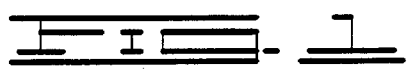
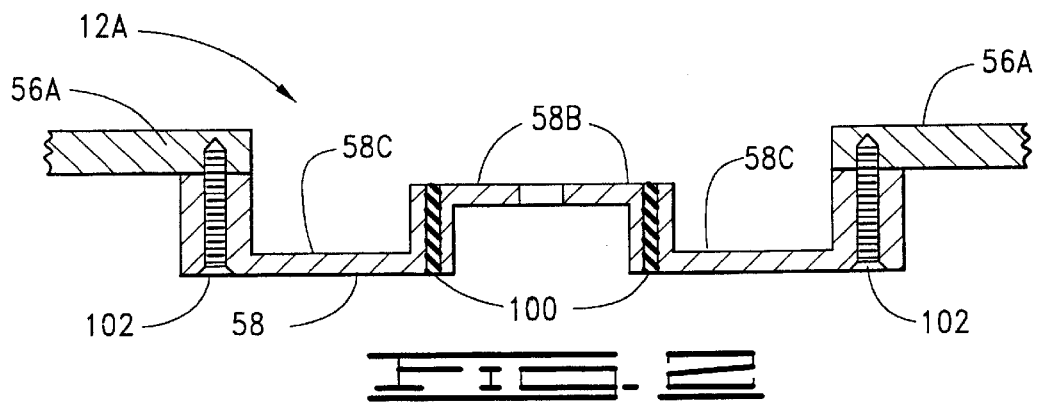

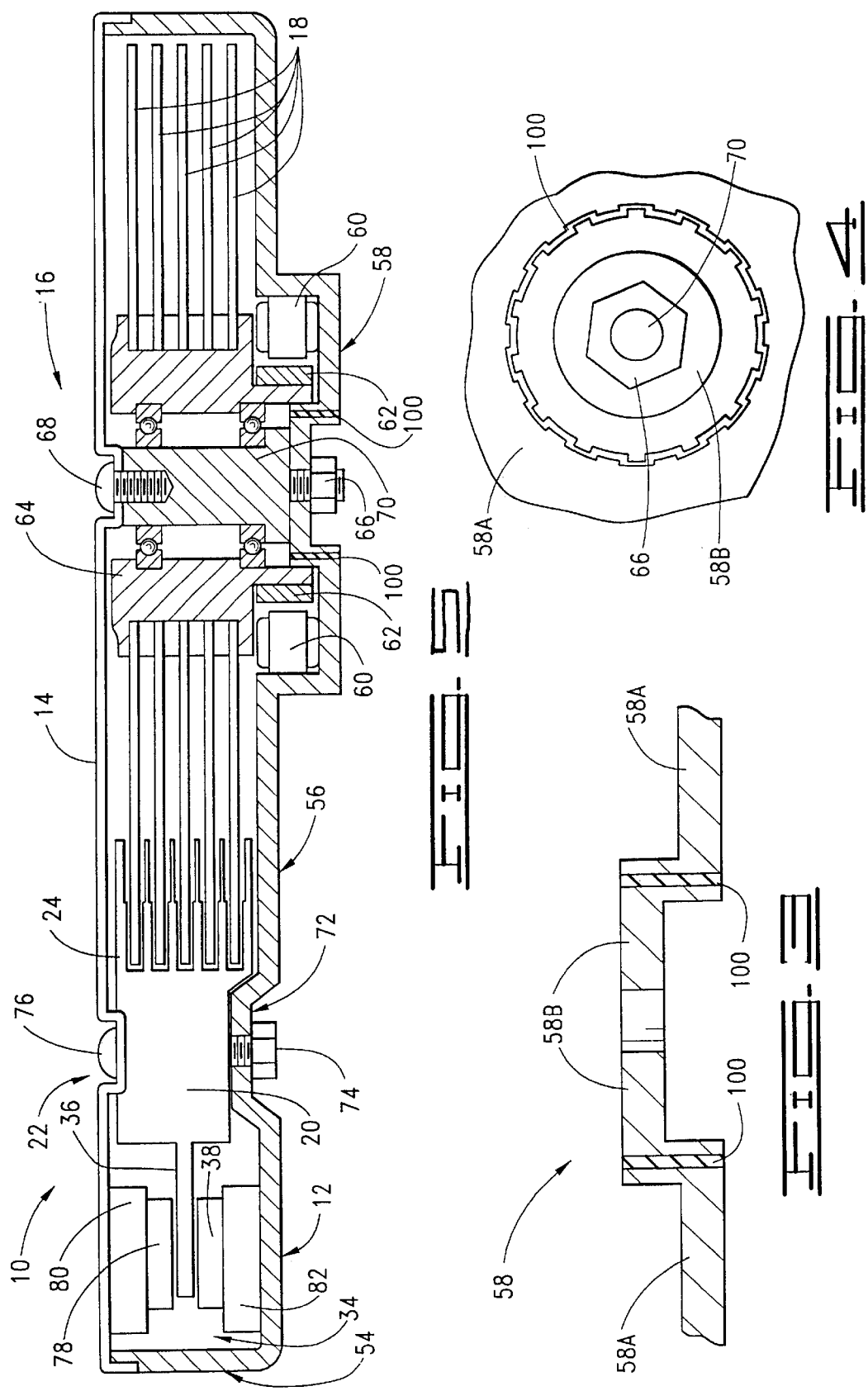

MECHANICAL ISOLATION FOR A DISC DRIVE SPINDLE MOTOR

RELATED APPLICATIONS

This application claims priority to U.S. Provisional Application Ser. No. 60/018,901 filed Jun. 3, 1996, entitled SPINDLE MOTOR ISOLATION SCHEME.

BACKGROUND OF THE INVENTION

1. Field of the Invention

This invention relates generally to the field of disc drive data storage devices, and more particularly, but not by way of limitation, to improvements in mechanical isolation of a disc drive spindle motor to reduce the generation of acoustic noise and to suppress the effects of external mechanical shocks applied to the disc drive.

2. Discussion

Disc drives are commonly used in workstations, personal computers, portables and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extends generally circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to fluid air currents caused by rotation of the disc.

Typically, several discs are stacked on top of each other and the surfaces of the discs are accessed by the heads mounted on a complementary stack of actuator arms which compose an actuator assembly, or "E-block". The E-block generally includes head wires which conduct electrical signals from the heads to a flex circuit, which in turn conducts the electrical signals to a printed circuit board (PCB) mounted to a disc drive base deck.

As will be recognized, the general trend in the industry is to provide disc drives with ever decreasing form factors and ever increasing storage capacities. Along with increases in spindle motor rotation speeds, areal density of recorded data and faster data access times by disc drive actuator assemblies, customer expectations further include continued reductions in the level of acoustic emissions generated by modern disc drives, as well as the ability to withstand greater levels of externally generated operational and non-operational mechanical vibrations (also referred to as mechanical shocks).

Acoustic noise is typically generated by a disc drive from resonant vibrations induced in the disc drive housing by the operation of the spindle motor and the actuator assembly. A mechanical shock is provided to a drive through the handling of the drive or the system in which the drive is embedded. When an external mechanical shock is sufficiently severe, contact can be made between the internal components of the drive, causing damage to the surfaces of the discs or to the heads and flexures of the actuator assembly. Thus, the suppression of acoustic noise and the protection from external mechanical shock are related in that both involve controlling the transfer of mechanical energy to the drive housing, and both are important considerations in a disc drive design.

A variety of approaches have been proposed in the prior art to suppress the generation of acoustic noise and to protect disc drives against mechanical shock; for example, see U.S. Pat. No. 5,475,545 entitled METHOD FOR REDUCING NOISE DURING SEEKS IN A HARD DISC DRIVE issued Dec. 12, 1995 to Hampshire et al., which discloses shaping the velocity profile of an actuator assembly during the acceleration phase of a seek to reduce acoustic noise generated by the seek. Additionally, see U.S. patent application Ser. No. 07/673,967 entitled ACOUSTIC ISOLATOR FOR A DISC DRIVE ASSEMBLY, filed Mar. 22, 1991 by Morris et al., which discloses an acoustic compliance area surrounding the point of attachment of the spindle motor to the base deck to decrease the generation of acoustic noise and to protect against mechanical shocks. Both of these references are assigned to the assignee of the present invention and are incorporated herein by reference.

While the prior art has been effective, continued reductions in the size and continued increases in storage capacity requirements results in the need for improvements in the mechanical isolation of a disc drive. It is to such improvements that the present invention is directed.

SUMMARY OF THE INVENTION

The present invention provides an apparatus for mechanically isolating an excitation source, such as a disc drive spindle motor, to reduce the generation of acoustic noise by and to suppress the effects of external mechanical shocks upon a disc drive.

Accordingly, the disc drive includes a base deck having a central opening, the central opening having an interior surface. A mechanical isolator comprising an annular ring of compliant material is disposed within the central opening of the base portion so that an exterior surface of the mechanical isolator is connected to the interior surface of the central opening in the base portion. The mechanical isolator further includes a central opening having an interior surface to which an exterior surface of an inner support portion is attached, the inner support portion supporting the excitation source.

The mechanical isolator serves to isolate the inner support portion from the base portion of the base deck, damping the transfer of mechanical energy between the base portion and the support portion. In this manner, vibrations generated by the excitation source are damped before being transferred to the base deck, limiting the generation of acoustic noise by the drive. Moreover, mechanical shocks provided to the base deck are damped by the mechanical isolator so that reduced amounts of vibration are transferred to the spindle motor, reducing the risk of internal damage as a result of the mechanical shocks.

In a preferred embodiment, the mechanical isolator comprises vulcanized butyl rubber which is injection molded into place between the inner support portion and the remaining portions of the base deck. Additionally, teeth and corresponding grooves can be advantageously provided in the surfaces of the inner support portion and the base deck in order to increase the contact surface areas between these elements and the isolator.

An object of the present invention is to improve the ability of a disc drive to withstand the effects of external operational and non-operational mechanical shocks.

Still another object is to reduce the generation of acoustic noise by the disc drive.

Yet another object is to provide mechanical isolation for the drive in an inexpensive and easily manufacturable manner.

Other objects, advantages and features of the present invention will be apparent from the following description when read in conjunction with the drawings and appended claims.

BRIEF DESCRIPTION OF THE DRAWINGS

FIG. 1 is a top plan view of a disc drive in which the present invention is particularly useful.

FIG. 2 is a cross-sectional view of the disc drive of FIG. 1, showing the preferred embodiment for a mechanical isolator of the present invention.

FIG. 3 is a cross-sectional view of the drive showing the mechanical isolator in greater detail.

FIG. 4 provides a bottom plan view of the mechanical isolator.

FIG. 5 is a cross-sectional view of the mechanical isolator in a preferred embodiment wherein the isolator is fabricated and subsequently integrated into the disc drive.

DETAILED DESCRIPTION OF THE PREFERRED EMBODIMENT

Turning now to the drawings and more particularly to FIG. 1, shown therein is a top plan view of a disc drive 10 in which the present invention is particularly useful.

The disc drive 10 includes a base deck 12 to which various disc drive components are mounted and a top cover 14, which is shown in a partial cut-away fashion to expose selected components of interest. It will be readily understood that the base deck 12 includes an interior surface to which various disc drive components are mounted as well as side walls which, in combination with the top cover 14, provide sufficient height to house these components within a sealed internal environment.

Mounted to the base deck 12 is a spindle motor (shown generally at 16) to which a plurality of discs 18 are mounted for rotation at a constant high speed. Adjacent the discs 18 is an actuator assembly 20 (hereinafter also referred to as an "E-block") which pivots about a pivot shaft assembly 22 in a rotary fashion. The E-block 20 includes actuator arms 24 which support gimbal assemblies 26 (hereinafter also sometimes referred to as "load springs"). The load springs 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), which are located in FIG. 1 near the inner diameter of the discs 18.

It will be recognized that the E-block 20 is provided with a latching arrangement (shown generally at 32) to secure the E-block 20 when the disc drive 10 is not in use. For a general discussion of typical E-block latching arrangements, see U.S. Pat. No. 5,231,556 entitled SELF-HOLDING LATCH ASSEMBLY, issued Jul. 27, 1993 to Blanks, assigned to the assignee of the present invention and incorporated herein by reference.

Continuing with FIG. 1, the E-block 20 is controllably positioned by way of a voice coil motor (VCM, shown generally at 34), comprising an actuator coil 36 immersed in the magnetic field generated by a permanent magnet 38. It will be recognized that a magnetically permeable flux path (such as a second permanent magnet in conjunction with a steel plate) is mounted above the actuator coil 36 to complete the magnetic circuit of the VCM 34, but for purposes of illustration this flux path has not been shown in FIG. 1. When controlled DC current is passed through the actuator coil 36, an electromagnetic field is set up which interacts with the magnetic circuit of the VCM 34 to cause the actuator coil 36 to move relative to the permanent magnet 38 in accordance with the well-known Lorentz relationship. As the actuator coil 36 moves, the E-block 20 pivots about the pivot shaft assembly 22, causing the heads 28 to move across the surfaces of the discs 18.

To provide the requisite electrical conduction paths between the heads 28 and disc drive read/write circuitry (not shown), head wires (not separately shown) are routed on the E-block 20 from the heads 28, along the gimbal assemblies 26 and the actuator arms 24, to a flex circuit assembly 40. The head wires are secured to corresponding pads of the flex circuit assembly 40. In turn, the flex circuit assembly 40 is connected to a flex circuit bracket (shown generally at 42) in a conventional manner to facilitate communication between the flex circuit bracket 42 and a printed circuit board (PCB) mounted to the underside of the disc drive 10.

Referring now to FIG. 2, shown therein is a cross-sectional view of the disc drive 10 of FIG. 1 (the PCB has not been shown for purposes of clarity). As shown in FIG. 2, the base deck 12 includes generally vertical side walls 54 and a generally horizontal base portion 56. The top cover 14 engages with the side walls 54 as shown to form the requisite sealed environment for the disc drive 10.

The base portion 56 of the base deck 12 supports the spindle motor 16 and the actuator assembly 20. More particularly, a boss 58 is provided in the base portion 56 to accommodate a plurality of stationary coils 60 of the spindle motor 16. Permanent magnets 62 are mounted to a rotatable hub 64 of the spindle motor 16 to which the discs 18 are attached. Thus, as will be recognized by those skilled in the art, the coils 60 are selectively energized to generate magnetic fields which interact with the magnetic fields of the permanent magnets 62 in order to rotate the discs 18 in the desired direction at the desired speed. Fasteners 66 and 68 are provided to secure a spindle motor shaft 70 to the base deck 12 and the top cover 14, respectively. More particularly, fastener 66 comprises a nut which engages a threaded portion (not separately designated) of the spindle motor shaft 70 which extends down through the base portion 56 and the fastener 68 comprises a threaded screw which secures the spindle motor shaft 70 to the top cover 14 by way of a threaded recess in the spindle motor shaft 70.

Additionally, the base portion 56 of the base deck 12 includes a beveled portion 72 which supports the attachment of the actuator assembly 20. More particularly, fasteners 74 and 76 are provided to secure the pivot shaft assembly (22, of FIG. 1) of the actuator assembly 20 to the base deck 12 and the top cover 14, respectively.

The actuator assembly 20 thus rotates about the pivot shaft assembly 22 in accordance with the operation of the VCM 34, which comprises the actuator coil 36 and the permanent magnet 38 of FIG. 1, as well as a second permanent magnet 78 and steel plates 80 and 82. For purposes of clarity, the gimbal assemblies 26 and heads 28 of the actuator assembly 20 have been omitted from FIG. 2.

Also shown in FIG. 2 is a mechanical isolator 100, formed as part of the base portion 56 of the base deck 12. Particularly, the isolator 100 comprises an annular ring of compliant material formed in the boss 58. As provided hereinbelow, the isolator 100 operates to mechanically isolate the spindle motor 16 from the base deck 12 so as to reduce the transfer of mechanical energy between the base deck 12 and the spindle motor 16.

FIG. 3 shows the isolator 100 in greater detail. As shown in FIG. 3, the boss 58 comprises an outer portion 58A and an inner portion 58B, with the isolator 100 formed therebetween. Preferably, the isolator 100 comprises a suitably compliant material, such as vulcanized butyl rubber which is injection molded into place between the outer and inner portions 58A, 58B during the manufacturing process. The cross-sectional height of the isolator 100 is substantially that of both the outer and inner portions 58A, 58B of the boss 58. Moreover, the cross-sectional width and the corresponding compliance of the isolator 100 are selected so as to provide the necessary damping of selected frequencies of interest. One important consideration is the mass of the disc drive spindle motor 16 and the number of associated discs 18 in the stack; a relatively larger mass may generally require a thicker isolator width, whereas a relatively smaller mass may generally require a thicker isolator width. For reference, an isolator 100 comprising vulcanized rubber having a width of about 0.024 inches and a Shore-A hardness of from about 70–80 has been found to be advantageous in particular applications.

Referring now to FIG. 4, shown therein is a bottom plan view of the isolator 100; more particularly, FIG. 4 represents a view taken from below the disc drive 10, showing the isolator 100 and the outer and inner portions 58A, 58B of the boss 58. As shown in FIG. 4, teeth with corresponding grooves disposed therebetween (not separately designated) can be advantageously provided in both the surfaces of the outer and inner portions 58A, 58B adjacent the isolator 100 in order to increase the surface area of, and hence the adhesion among these constituent elements. Whereas a selected number of teeth and grooves have been shown in FIG. 4, it will be recognized that other configurations can readily be selected as desired. Additionally, although the preferred embodiment provides the isolator 100 to be formed as an annular ring so that it is generally circular in shape, other shapes can be used as desired, depending upon the application.

As will be recognized, the preferred method of forming the isolator 100 is through a suitable injection molded or similar process; however, it will be recognized that such a process would generally require submitting the entire base deck 12 to the process supplier or operation, which may be logistically difficult in large scale manufacturing operations. Thus, FIG. 5 has been provided which illustrates an alternative approach wherein a selected portion of the base deck 12 (such as the boss 58) is separately fabricated and then later integrated into the disc drive 10.

More particularly, FIG. 5 provides a cross-sectional view of the isolator 100 and the inner portion 58B of FIGS. 3 and 4 in conjunction with an attachable outer portion 58C, which attaches to a base portion 56A of a base deck 12A. It is contemplated that the inner and outer portions 58B, 58C could be separately subjected to the injection molded process in order to form the isolator 100 therebetween. The assembly could subsequently be secured to the base deck 12A using suitable fasteners, shown at 102.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A base deck for a disc drive having a rotatable disc and a controllable actuator adjacent the disc, the actuator including a head for writing and reading data to and from the surface of the disc, the disc drive further including a spindle motor for controllably rotating the disc, the base deck comprising:

a base portion having a central opening, the central opening having an interior surface a spindle motor support assembly, comprising:

an outer spindle motor support portion attachable to the base portion, having a central opening aligned with the base portion central opening;

a mechanical isolator disposed within the central opening of the outer spindle motor support portion, the mechanical isolator having an exterior surface connected to the interior surface of the central opening in the outer spindle motor support portion, the mechanical isolator further comprising a compliant material and having a central opening, the central opening having an interior surface; and an inner spindle motor support portion disposed within the central opening of the mechanical isolator, the inner spindle motor support portion having an exterior surface connected to the interior surface of the central opening in the mechanical isolator, the inner spindle motor support portion supporting the disc drive spindle motor;

wherein the mechanical isolator is disposed between the outer spindle motor support portion and the inner spindle motor support portion so as to mechanically isolate the inner spindle motor support portion from the outer spindle motor support portion.

2. The base deck of claim 1, wherein the interior surface of the central opening of the outer spindle motor support portion includes teeth having grooves formed therebetween, the teeth and grooves having corresponding surfaces, and wherein the mechanical isolator contacts the surfaces of the teeth and the grooves of the base portion.

3. The base deck of claim 1, wherein the exterior surface of the inner spindle motor support portion includes teeth having grooves formed therebetween, the teeth and grooves having corresponding surfaces, and wherein the mechanical isolator contacts the surfaces of the teeth and the grooves of the inner spindle motor support portion.

4. The base deck of claim 1, wherein the mechanical isolator is formed from a method comprising the steps of:

securing the outer spindle motor support portion relative to the inner spindle motor support portion; and injection molding compliant material therebetween to form the mechanical isolator.

5. The base deck of claim 1, wherein the mechanical isolator comprises butyl rubber.

6. The base deck of claim 1, wherein the mechanical isolator is characterized substantially as an annular ring about the inner spindle motor support portion.

7. The base deck of claim 1, wherein the spindle motor support assembly forms a boss when affixed to the base portion.

8. The base deck of claim 1, wherein the spindle motor support assembly is rigidly affixed to the base portion using a plurality of threaded fasteners.

9. An improved disc drive base deck for a disc drive comprising an excitation source mounted to the base deck, the base deck comprising:

a base portion having a central opening;

an excitation source support assembly affixable to the base portion to form the base deck, comprising:

an excitation support portion supporting the excitation source at a contact point, the excitation support portion having an exterior surface radially displaced from the contact point;

an outer support portion having a central opening having an interior surface; and an annular ring of compliant material disposed between the excitation support portion and the outer support portion, which isolates the excitation support portion from the interior surface of the outer support portion.

10. The base deck of claim 9, wherein the isolation means comprises an annular ring of compliant material comprising vulcanized butyl rubber.

11. The base deck of claim 9, wherein the exterior surface of the excitation support portion includes teeth and grooves disposed therebetween, the teeth and grooves having corresponding surfaces, and wherein the isolation means contacts the surfaces of the teeth and the grooves of the excitation support portion.

12. The base deck of claim 9, wherein the central opening of the outer support portion has teeth and grooves formed therebetween, the teeth and grooves having corresponding surfaces, and wherein the isolation means contacts the surfaces of the teeth and the grooves of the central opening.

13. The base deck of claim 9, wherein the isolation means comprises a butyl rubber which is injection molded between the excitation support portion and the remaining portions of the base deck.

14. The base deck of claim 9, wherein the excitation source support assembly forms a boss when affixed to the base portion.

15. The base deck of claim 9, wherein the excitation source support assembly is rigidly affixed to the base portion using a plurality of threaded fasteners.

* * * * *